(12) United States Patent
Fujimoto

(10) Patent No.: US 7,240,479 B1
(45) Date of Patent: Jul. 10, 2007

(54) ABNORMALITY DIAGNOSIS APPARATUS FOR INTERNAL COMBUSTION ENGINE

(75) Inventor: Shinya Fujimoto, Hyogo (JP)

(73) Assignee: Mitsubishi Electronic Corporation, Tokyo (JP)

(*) Notice: Subject to any disclaimer, the term of this patent is extended or adjusted under 35 U.S.C. 154(b) by 0 days.

(21) Appl. No.: 11/487,983

(22) Filed: Jul. 18, 2006

(30) Foreign Application Priority Data

Apr. 5, 2006 (JP) .............................. 2006-104242

(51) Int. Cl.
*F01N 3/00* (2006.01)
(52) U.S. Cl. .......................................... 60/277; 60/285
(58) Field of Classification Search ................. 60/285, 60/277
See application file for complete search history.

(56) References Cited

U.S. PATENT DOCUMENTS

| | | | | |
|---|---|---|---|---|
| 5,743,085 | A * | 4/1998 | Takaku et al. ................. | 60/276 |
| 5,921,078 | A * | 7/1999 | Takaku et al. ................. | 60/277 |
| 6,330,795 | B1 * | 12/2001 | Takaku et al. ................. | 60/277 |
| 6,408,617 | B1 * | 6/2002 | Takaku et al. ................. | 60/277 |
| 6,797,517 | B1 * | 9/2004 | Hoshi et al. .................. | 436/37 |
| 7,117,664 | B2 * | 10/2006 | Takaku et al. ................. | 60/277 |
| 7,117,665 | B2 * | 10/2006 | Kamoto et al. ................ | 60/277 |

FOREIGN PATENT DOCUMENTS

| | | |
|---|---|---|
| JP | 6-129240 A | 5/1994 |
| JP | 2003-014683 A | 1/2003 |
| JP | 2004-204716 A | 7/2004 |

* cited by examiner

*Primary Examiner*—Thomas Denion
*Assistant Examiner*—Loren Edwards
(74) *Attorney, Agent, or Firm*—Sughrue Mion, PLLC

(57) ABSTRACT

In a system that executes air fuel ratio feedback control based on air fuel ratio signals of a pair of air fuel ratio sensors arranged at locations upstream and downstream of a catalyst of an internal combustion engine, an abnormality diagnosis apparatus can diagnose abnormality in a fuel system of the internal combustion engine in an accurate manner by using a signal of the air fuel ratio sensor downstream of the catalyst. A control unit in the form of an ECU (30) includes a feedback operation state determination section (32), an oxygen storage saturation determination section (33), an averaging start determination section (34), an averaging section (35), and an abnormality determination section (36). An abnormality in the fuel system of the internal combustion engine is determined by using a second air fuel ratio signal (V2) output from the second air fuel ratio sensor downstream of the catalyst only when the amount of oxygen storage in the catalyst is saturated.

5 Claims, 12 Drawing Sheets

ABNORMALITY DIAGNOSIS APPARATUS FOR INTERNAL COMBUSTION ENGINE

BACKGROUND OF THE INVENTION

1. Field of the Invention

The present invention relates to an abnormality diagnosis apparatus for an internal combustion engine capable of diagnosing the presence or absence of abnormality in the internal combustion engine in which a three-way catalytic converter (hereinafter simply referred to as a "catalyst") for purifying an exhaust gas is arranged in an exhaust system, with a pair of air fuel ratio sensors being disposed at locations upstream and downstream of the catalyst.

2. Description of the Related Art

As a conventional abnormality diagnosis apparatus for an internal combustion engine, there has hitherto been known one in which a pair of air fuel ratio sensors are arranged at locations upstream and downstream of a catalyst, so that an abnormality in the catalyst is detected based on detection signals from the individual air fuel ratio sensors (see, for example, a first patent document: Japanese patent application laid-open No. H6-129240).

Also, there has been proposed an apparatus in which a pair of air fuel ratio sensors are arranged at locations upstream and downstream of a catalyst, and an abnormality in an air fuel ratio feedback control system is detected based on an oxygen sensor downstream of the catalyst (see, for example, a second patent document: Japanese patent application laid-open No. 2004-204716).

In addition, there has been proposed an apparatus in which the amount of oxygen storage during a fuel-cut operation is calculated so that an abnormality in an oxygen sensor downstream of a catalyst is diagnosed in accordance with the amount of oxygen storage (see, for example, a third patent document: Japanese patent application laid-open No. 2003-14683).

In the conventional abnormality diagnosis apparatuses for an internal combustion engine, in case of the first patent document, there is a problem that an abnormality in the catalyst can be determined, but an abnormality in the fuel control system can not be detected.

Also, in case of the second patent document, an abnormality in the feedback control system is detected by the oxygen sensor downstream of the catalyst, but no consideration is given to the state of the oxygen storage in the catalyst, and no account is taken of the case where the amount of feedback control by means of the oxygen sensor downstream of the catalyst is limited to a small value because of the amount of oxygen storage in the catalyst, or the case where the signal of the oxygen sensor downstream of the catalyst is output in a delayed manner, so there is a problem of possibility of making an incorrect abnormality determination.

Moreover, since no consideration is given to the state of the catalyst, there is a problem of possibility of making an incorrect abnormality determination when the output signal of the oxygen sensor downstream of the catalyst is disturbed or fluctuated due to deactivation or degradation of the catalyst.

In addition, in the third patent document, the amount of oxygen storage in the catalyst is calculated but only an abnormality in the oxygen sensor downstream of the catalyst is diagnosed, thus posing a problem that an abnormality in the fuel control system can not be detected.

Further, in the feedback control according to the signals of the oxygen sensors upstream and downstream of the catalyst, as in the conventional apparatuses described in the above-mentioned first through third patent documents, there arises the following problem. That is, in case where there occurs a situation where an amount of fuel more than estimated is injected due to the occurrence of abnormality in the fuel system, e.g., abnormality in a fuel injector only for one cylinder in a multicylinder internal combustion engine, it becomes impossible to control the exhaust gas downstream of the catalyst within a normal range because of the construction or configuration of each of the conventional apparatuses.

SUMMARY OF THE INVENTION

Accordingly, the object of the present invention is to obtain an abnormality diagnosis apparatus for an internal combustion engine which is capable of detecting an abnormality in a fuel control system by performing the determination of abnormality only when the amount of oxygen storage in a catalyst is saturated, and by determining an abnormal state of the fuel control system when an average value of an air fuel ratio detected by an air fuel ratio sensor downstream of the catalyst becomes out of a predetermined range.

Bearing the above object in mind, according to the present invention, there is provided an abnormality diagnosis apparatus for an internal combustion engine which includes a variety of kinds of sensors that detect an operating condition of the internal combustion engine having an exhaust system; a first air fuel ratio sensor and a second air fuel ratio sensor that are arranged at locations upstream and downstream of a catalyst arranged in the exhaust system for detecting the concentration of a specific component in an exhaust gas; a first comparison section that compares a first output signal value of the first air fuel ratio sensor with a first comparison value; a second comparison section that compares a second output signal value of the second air fuel ratio sensor with a second comparison value; a comparison value calculation section that calculates the first comparison value in accordance with a comparison result of the second comparison section; and an air fuel ratio correction amount calculation section that calculates an air fuel ratio correction amount corresponding to a comparison result of the first comparison section, The apparatus further includes: a feedback control section that controls an amount of fuel supplied to the internal combustion engine in accordance with the air fuel ratio correction amount in a feedback manner; a feedback operation state determination section that determines whether the engine operating state is a feedback operation state in which the feedback control section is operated; an averaging section that averages the second output signal value during operation of the comparison value calculation section; an oxygen storage saturation determination section that determines whether an amount of oxygen storage in the catalyst is in a saturated state; an averaging start determination section that activates the averaging section only when the oxygen storage saturation determination section determines that the amount of oxygen storage in the catalyst is saturated; and a fuel control system abnormality determination section that determines the presence of abnormality in the fuel control system of the internal combustion engine when the air fuel ratio average value calculated by the averaging section becomes out of a predetermined range. The oxygen storage saturation determination section calculates a time of execution of feedback control elapsed after a determination result of the feedback operation state determination section has changed from a non-feedback operation state into a feedback operation state, and determines that the amount of oxygen storage in the catalyst is saturated when the elapsed time reaches a predetermined time or more at which the amount of oxygen storage in the catalyst becomes a predetermined value.

According to the present invention, it is possible to perform abnormality detection by means of a signal from an oxygen sensor downstream of a catalyst without changing the construction or configuration of the apparatus, whereby an abnormality in a fuel control system can be detected by removing the influence of the catalyst in an appropriate manner.

In addition, since abnormality can be detected by removing the influence of the catalyst in an appropriate manner, it is possible to avoid, by providing a warning, an undesirable situation in which the vehicle is made to travel while generating a large amount of exhaust gas.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Embodiment 1

Figure 1:
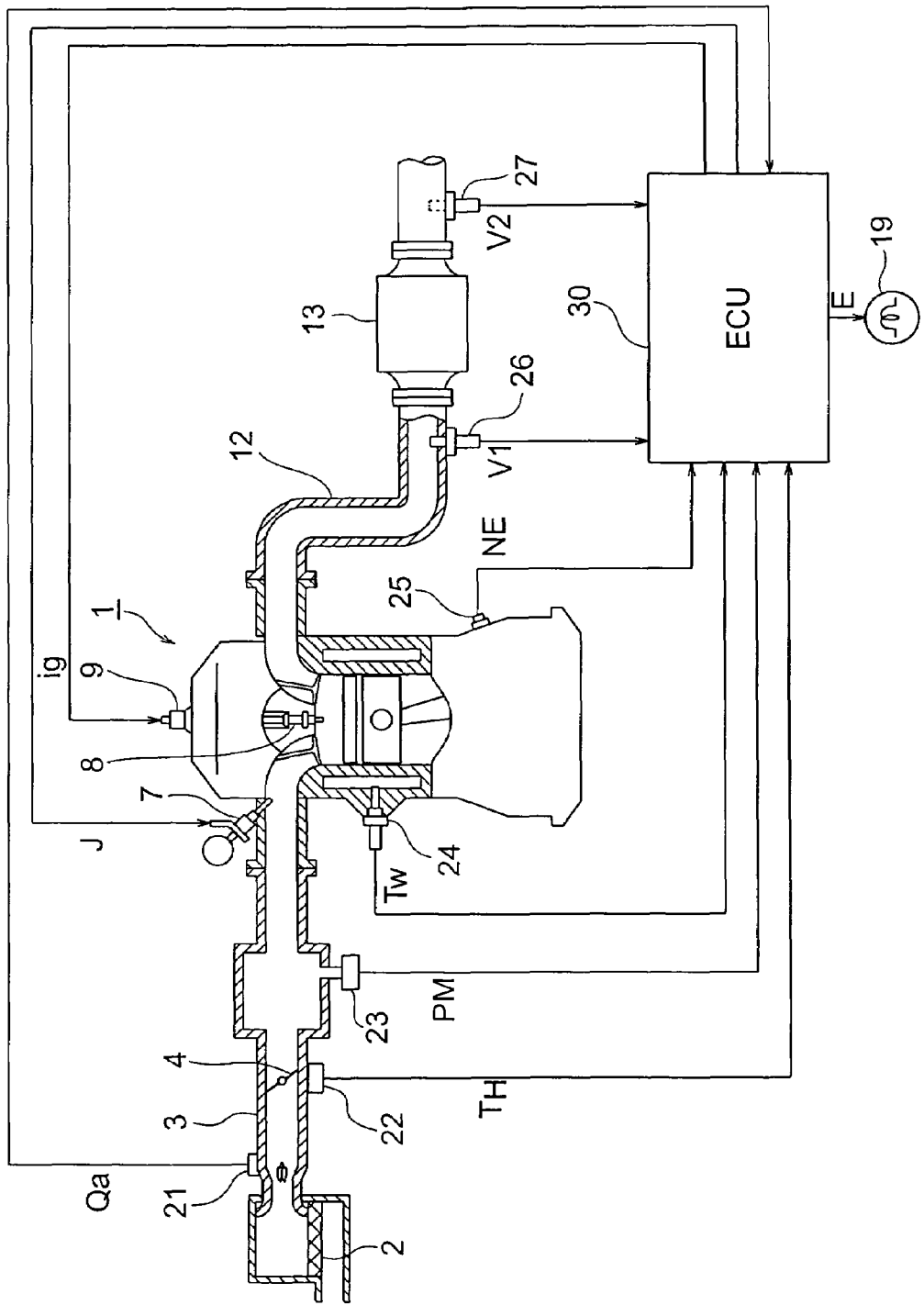
FIG. 1 is a construction view conceptually showing an abnormality diagnosis apparatus for an internal combustion engine together with its peripheral equipment according to a first embodiment of the present invention.

Referring to the drawings and first to FIG. 1, there is conceptually shown an abnormality diagnosis apparatus for an internal combustion engine together with its peripheral equipment according to a first embodiment of the present invention.

In FIG. 1, the abnormality diagnosis apparatus for an internal combustion engine is mainly composed of an ECU (electronic control unit) 30. Here, note that the construction of FIG. 1 is similar to that of a conventional apparatus except for the fact that the control function of the ECU 30 in the form of a microcomputer is partially different therefrom.

The internal combustion engine, generally designated at a reference numeral 1, includes an intake pipe 3 for introducing intake air into the internal combustion engine 1 through an air cleaner 2, an injector 7 for injecting fuel into the intake pipe 3, a spark plug 8 for firing an air fuel mixture in a combustion chamber, an igniter 9 having an ignition coil for generating a discharge spark in the spark plug 8, an exhaust pipe 12 for discharging an exhaust gas generated by combustion of the air fuel mixture in the combustion chamber to an ambient atmosphere, a temperature sensor 24 for detecting the temperature TW of engine cooling water, and a crank angle sensor 25 for detecting the rotational speed NE of the internal combustion engine 1.

Mounted on the intake pipe 3 that constitutes an intake system, are a throttle valve 4 for adjusting the amount or flow rate of intake air Qa, an air flow sensor 21 for detecting the amount or flow rate of intake air Qa, a throttle sensor 22 for detecting the opening degree TH of the throttle valve 4 (hereinafter referred to as a throttle opening TH), and a pressure sensor 23 for detecting the pressure PM of the intake air in the intake pipe 3 (hereinafter referred to as an intake pressure PM).

Also, mounted on the exhaust pipe 12 that constitutes an exhaust system, are a catalyst 13 for purifying the exhaust gas, a first air fuel ratio sensor 26 disposed at a location upstream of the catalyst 13 for generating a first air fuel ratio signal V1 representing an air fuel ratio of the mixture upstream of the catalyst 13, and a second air fuel ratio sensor 27 disposed at a location downstream of the catalyst 13 for generating a second air fuel ratio signal V2 representing an air fuel ratio of the mixture downstream of the catalyst 13.

The detected pieces of information of the various kinds of sensors 21 through 25 (i.e., the amount of intake air Qa, the throttle opening TH, the intake pressure PM, the cooling water temperature TW, and the engine rotational speed NE) are input to the ECU 30 as engine operating condition signals D together with the first and second air fuel ratio signals V1, V2 from the first and second air fuel ratio sensors 26, 27, respectively.

The ECU 30 calculates the individual control quantities of the various kinds of actuators based on the various kinds of sensor signals, and outputs, for example, an injection signal J to the injector 7 and an ignition signal ig to the igniter 9. Also, the ECU 30 outputs an alarm drive signal E to an alarm lamp 19 when an abnormality determination is made.

In addition, the ECU 30 is provided with a fuel system abnormality determination section for the internal combustion engine 1 and a general air fuel ratio feedback control calculation section (hereinafter also referred to simply as an "air fuel ratio control section").

Figure 2:
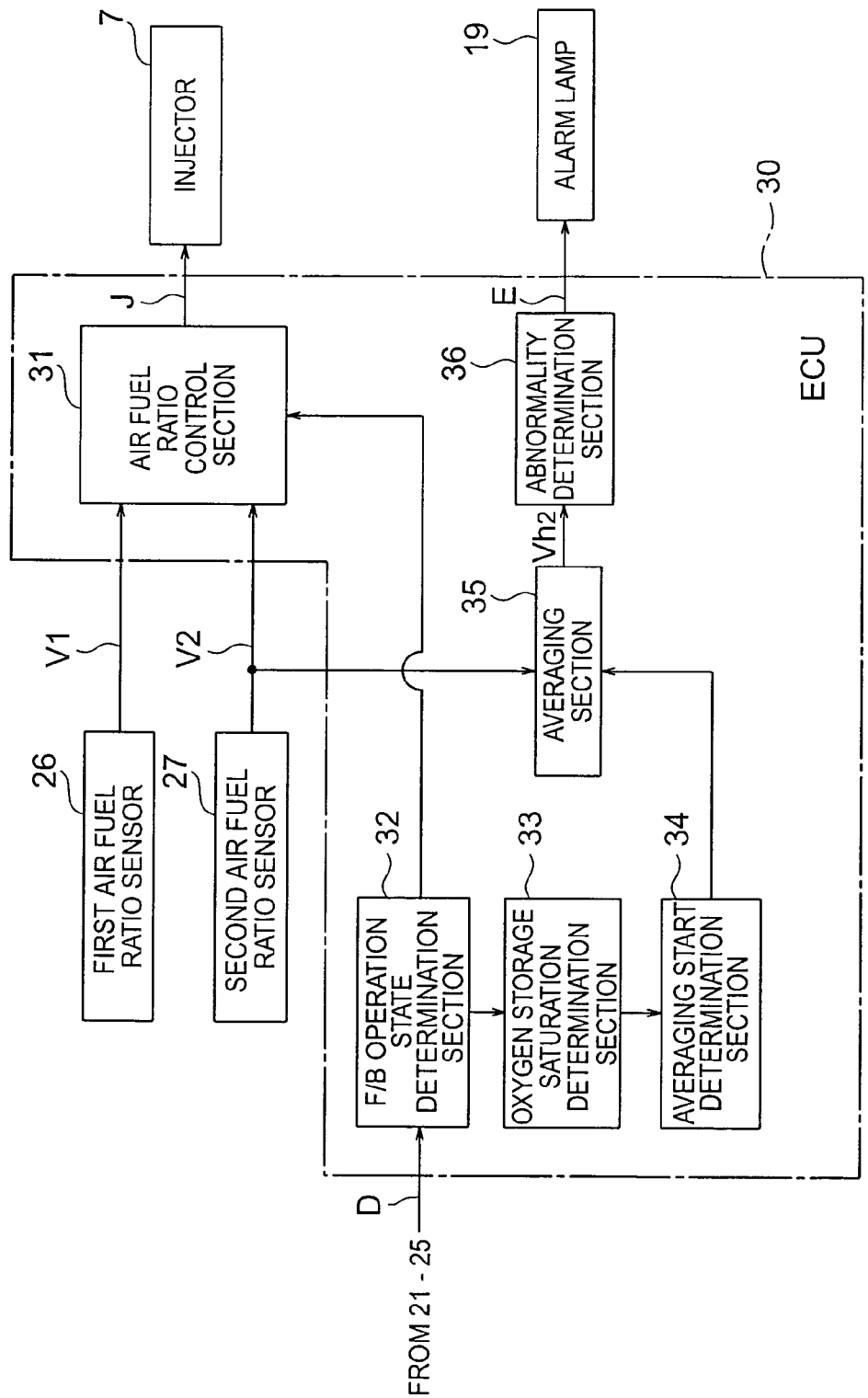
FIG. 2 is a functional block diagram showing a specific configuration of an ECU according to the first embodiment of the present invention while focusing on a fuel system abnormality determination section.
Figure 3:
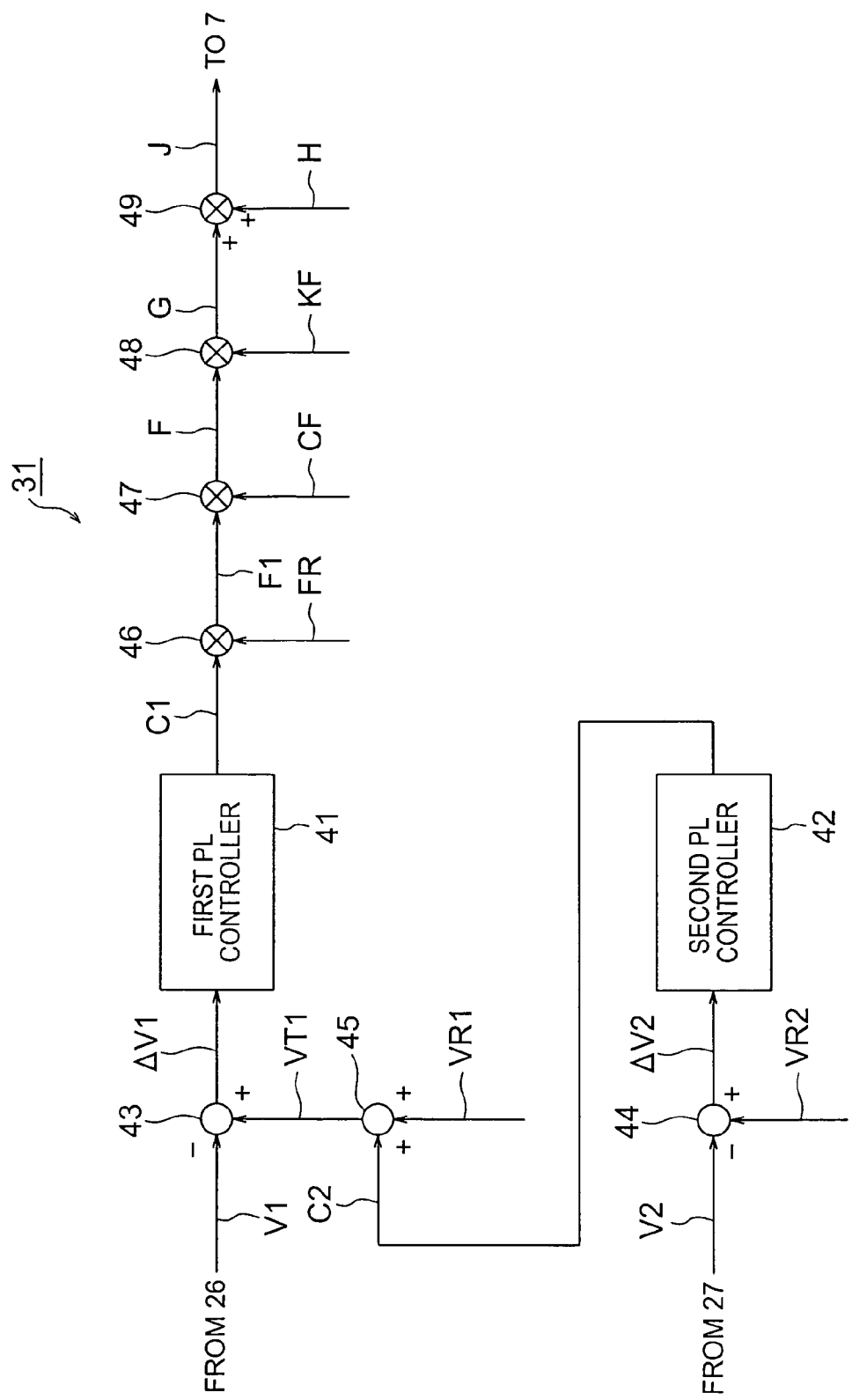
FIG. 3 is a functional block diagram schematically showing an air fuel ratio feedback control calculation section in the ECU according to the first embodiment of the present invention.

FIG. 2 is a functional block diagram that shows a specific configuration in the ECU 30 while focusing on the fuel system abnormality determination section, and FIG. 3 is a functional block diagram that schematically shows the air fuel ratio feedback control calculation section in the ECU 30.

In FIG. 2, the engine operating condition signals D from the various kinds of sensors 21 through 25 and the first and second air fuel ratio signals V1, V2 (output signal values each corresponding to the concentration of a specific component in the exhaust gas) from the first and second air fuel ratio sensors 26, 27 are input to the ECU 30, as previously stated. Also, the injection signal J to the injector 7 and the alarm drive signal E to the alarm lamp 19 are output from the ECU 30.

The ECU 30 includes an air fuel ratio control section 31, a feedback operation state determination section 32, an oxygen storage saturation determination section 33, an averaging start determination section 34, an averaging section 35, and an abnormality determination section 36.

The feedback operation state determination section 32 determines based on the operation state signal D whether the operating state that the operating condition of the internal combustion engine 1 is in a state in which the feedback control section in the air fuel ratio control section 31 is operated.

The air fuel ratio control section 31 calculates, in response to the result of the determination of the feedback operation state determination section 32, calculation processing based on the first and second the air fuel ratio signals V1, V2 and generates an injection signal J.

The oxygen storage saturation determination section 33 determines the saturation state of the amount of oxygen storage in the catalyst 13 based on the result of the determination of the feedback operation state determination section 32.

Specifically, the oxygen storage saturation determination section 33 calculates the time of the execution of the feedback control elapsed after the determination result of the feedback operation state determination section 32 has changed from a non-feedback operation state into a feedback operation state, and determines that the amount of oxygen storage in the catalyst 13 is saturated when the elapsed time reaches a predetermined time at which the amount of oxygen storage in the catalyst 13 becomes a predetermined value.

The averaging start determination section 34 outputs an averaging start command to activate the averaging section 35 only when the oxygen storage saturation determination section 33 determines that the amount of oxygen storage in the catalyst 13 is saturated.

The averaging section 35 performs, in response to the averaging start command from the averaging start determination section 34, averaging processing on the second air fuel ratio signal V2 during operation of a comparison value calculation section (to be described later) in the air fuel ratio control section 31 thereby to calculate an air fuel ratio average value Vh2 of the second air fuel ratio signal V2.

When the air fuel ratio average value Vh2 calculated by the averaging section 35 becomes out of the predetermined range, the fuel control system abnormality determination section 36 determines that there is an abnormality in the fuel control system of the internal combustion engine 1, and outputs an alarm drive signal E.

In FIG. 3, the air fuel ratio control section 31 is provided with a first PI (proportional integral) controller 41, a second PI controller 42, a subtracter 43 connected to the first PI controller 41, a subtracter 44 and an adder 45 that are connected to the second PI controller 42, and multipliers 46 through 48 and an adder 49 that are connected to an output side of the first PI controller 41.

The subtracter 43 constitutes a first comparison section, and compares the first air fuel ratio signal V1 (output signal value) with a first comparison value (correction target value VT1 to be described later) thereby to calculate an air fuel ratio deviation ΔV1 as the result of comparison.

The subtracter 44 constitutes a second comparison section, and compares the second air fuel ratio signal V2 (output signal value) with a second comparison value (second target value VR2 to be described later) thereby to calculate an air fuel ratio deviation ΔV2 as the result of comparison.

In addition, the second PI controller 42 and the adder 45 together constitute a comparison value calculation section, and calculates a first comparison value (correction target value VT1) in accordance with the comparison result (air fuel ratio deviation ΔV2) of the second comparison section (subtracter 44).

The first PI controller 41 constitutes an air fuel ratio correction amount calculation section, and calculates an air fuel ratio correction amount (air fuel ratio control amount C1 to be described later) in accordance with the comparison result (air fuel ratio deviation ΔV1) of the first comparison section (subtracter 43).

Further, the multipliers 46 through 48 and the adder 49 constitute a feedback control section, and controls the amount of fuel supplied to the internal combustion engine 1 in a feedback manner in accordance with the air fuel ratio correction amount (air fuel ratio control amount C1).

The first PI controller 41 executes PI control on the air fuel ratio signal V1 from the first air fuel ratio sensor 26, and the second PI controller 42 executes PI control on the air fuel ratio signal V2 from the second air fuel ratio sensor 27.

The individual PI controllers 41, 42 calculate the air fuel ratio control amounts C1, C2 based on the air fuel ratio signals V1, V2, respectively. Specifically, the subtracter 44 calculates the air fuel ratio deviation ΔV2 (=VR2−V2) between the second target value VR2 set beforehand and the air fuel ratio signal V2, and the second PI controller 42 calculates the air fuel ratio control amount C2 from the air fuel ratio deviation ΔV2.

The adder 45 adds the first target value VR1 set beforehand and the air fuel ratio control amount C2 thereby to calculate the correction target value VT1 (=VR1+C2).

Hereinafter, the subtracter 43 calculates the air fuel ratio deviation ΔV1 (=VT1−V1) between the correction target value VT1 and the first air fuel ratio signal V1, and the first PI controller 41 calculates the air fuel ratio control amount C1 from the air fuel ratio deviation ΔV1.

The multiplier 46 calculates a target fuel amount F1 (=C1×FR) by multiplying the air fuel ratio control amount C1 by a basic fuel amount FR, and the multiplier 47 calculates a correction fuel amount F (=F1×CF) by multiplying the target fuel amount F1 by a fuel correction amount CF. Also, the multiplier 48 calculates a drive time G (=F× KF) of the injector 7 by multiplying the correction fuel amount F by an injection time correction factor KF.

Finally, the adder 49 generates and outputs an injection signal J (=G+H) by adding a dead time correction amount H to the drive time G.

Next, further specific reference will be made to the processing operation of the feedback operation state determination section 32 (see FIG. 2) in the ECU 30.

Figure 4:
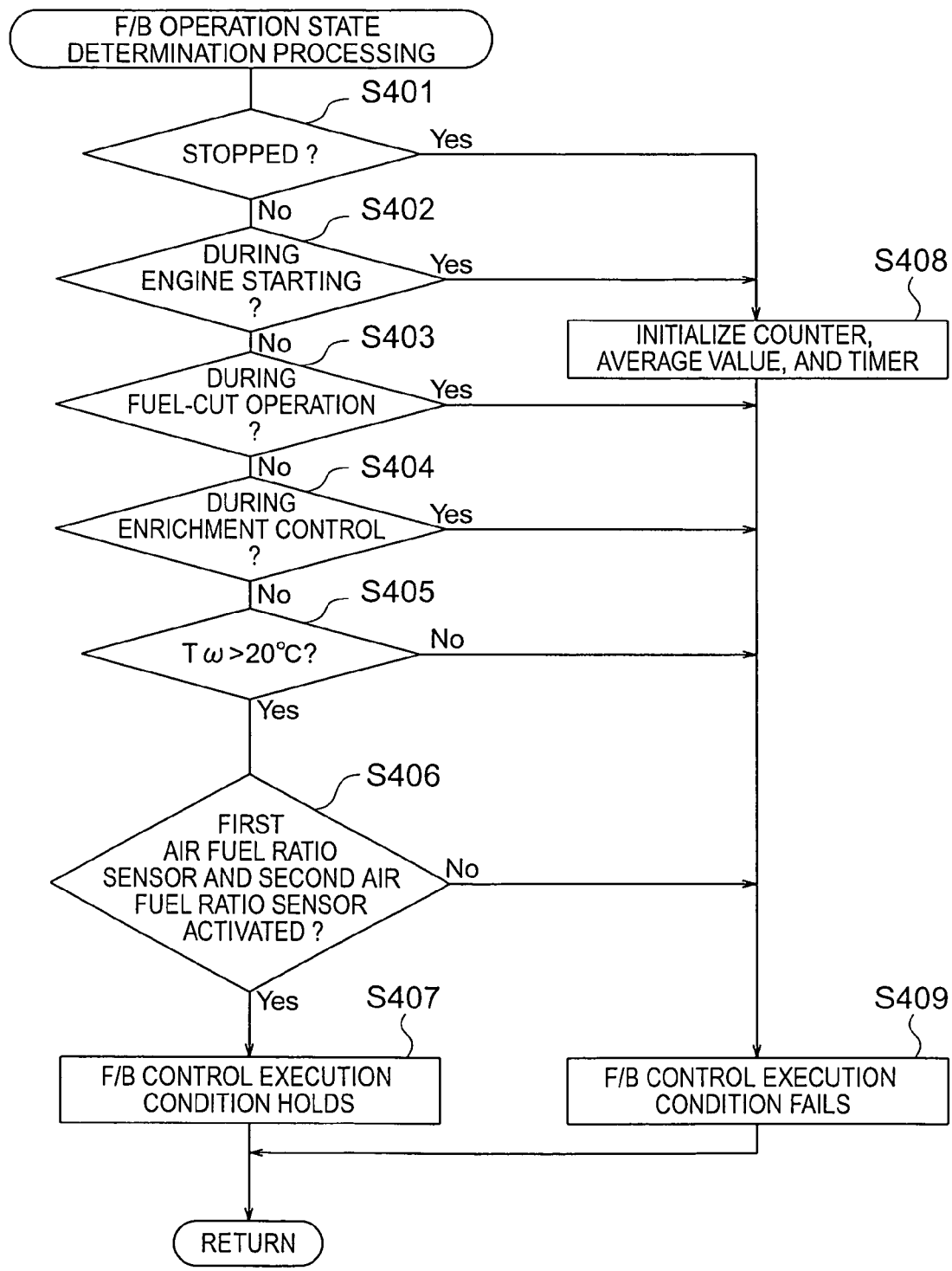
FIG. 4 is a flow chart illustrating the processing operation of a feedback operation state determination section according to the first embodiment of the present invention.

FIG. 4 is a flow chart that illustrates the processing operation of the feedback operation state determination section 32 according to the first embodiment of the present invention. In FIG. 4, the feedback operation state determination section 32 first determines whether the internal combustion engine 1 is in a stopped state (step S401), and when it is determined that the internal combustion engine 1 is not in a stopped state (that is, No), it is subsequently determined whether the internal combustion engine 1 is under engine starting operation (step S402).

When it is determined in step S402 that the internal combustion engine 1 is not under engine starting operation (that is, No), it is then determined whether the engine operating state is in a fuel-cut operation (step S403), and when it is determined that the engine operating state is not in a fuel-cut operation (that is, No), it is subsequently determined whether the engine operating state is under fuel enrichment control (step S404).

When it is determined in step S404 that the engine operating state is not under fuel enrichment control (that is, No), it is subsequently determined whether the internal combustion engine 1 is in a warm-up state (e.g., the cooling water temperature TW is higher than 20° C.) (step S405), and when it is determined as TW>20° C. (that is, Yes), it is further determined whether the first and second air fuel ratio sensors 26, 27 are activated (step S406).

When it is determined in step S406 that the first and second air fuel ratio sensors 26, 27 are activated (that is, Yes), it is assumed that the internal combustion engine 1 is in a feedback operation state in which the execution condition of feedback control holds, so a feedback control hold flag is set (step S407), and the processing routine of FIG. 4 is terminated.

On the other hand, when it is determined in step S401 that the internal combustion engine 1 is in a stopped state (that is, Yes), or when it is determined in step S402 that the internal combustion engine 1 is under engine starting operation (that is, Yes), various kinds of parameters (e.g., a counter value, an average value, a timer, etc., which are used in the processing of individual embodiments to be described later) used in processing routines to be described later are initialized (step S408), and it is assumed that the feedback control execution condition fails, so the feedback control hold flag is cleared (step S409), and the processing routine of FIG. 4 is terminated.

In addition, when it is determined in step S403 that the operating state of the internal combustion engine 1 is in a fuel-cut operation (that is, Yes), or when it is determined in step S404 that the engine operating state is under fuel enrichment control (that is, Yes), or when it is determined in step S405 that the cooling water temperature TW is lower than or equal to 20° C. (TW≦20° C.) (that is, No), or when it is determined in step S406 that the first and second air fuel ratio sensors 26, 27 are not activated (that is, No), it is assumed that the feedback control execution condition fails, so the feedback control hold flag is cleared (step S409), and the processing routine of FIG. 4 is terminated.

The operating condition according to the feedback operation state determination section 32 may be set in any manner as long as feedback control is to be carried out by using the first and second air fuel ratio sensors 26, 27, and the present invention is not limited to the processing operation of FIG. 4.

For example, an engine operating condition including the amount of intake air Qa detected by the air flow sensor 21 may be added.

Next, further specific reference will be made to the processing operation of the averaging section 35 (see FIG. 2) in the ECU 30.

Figure 5:
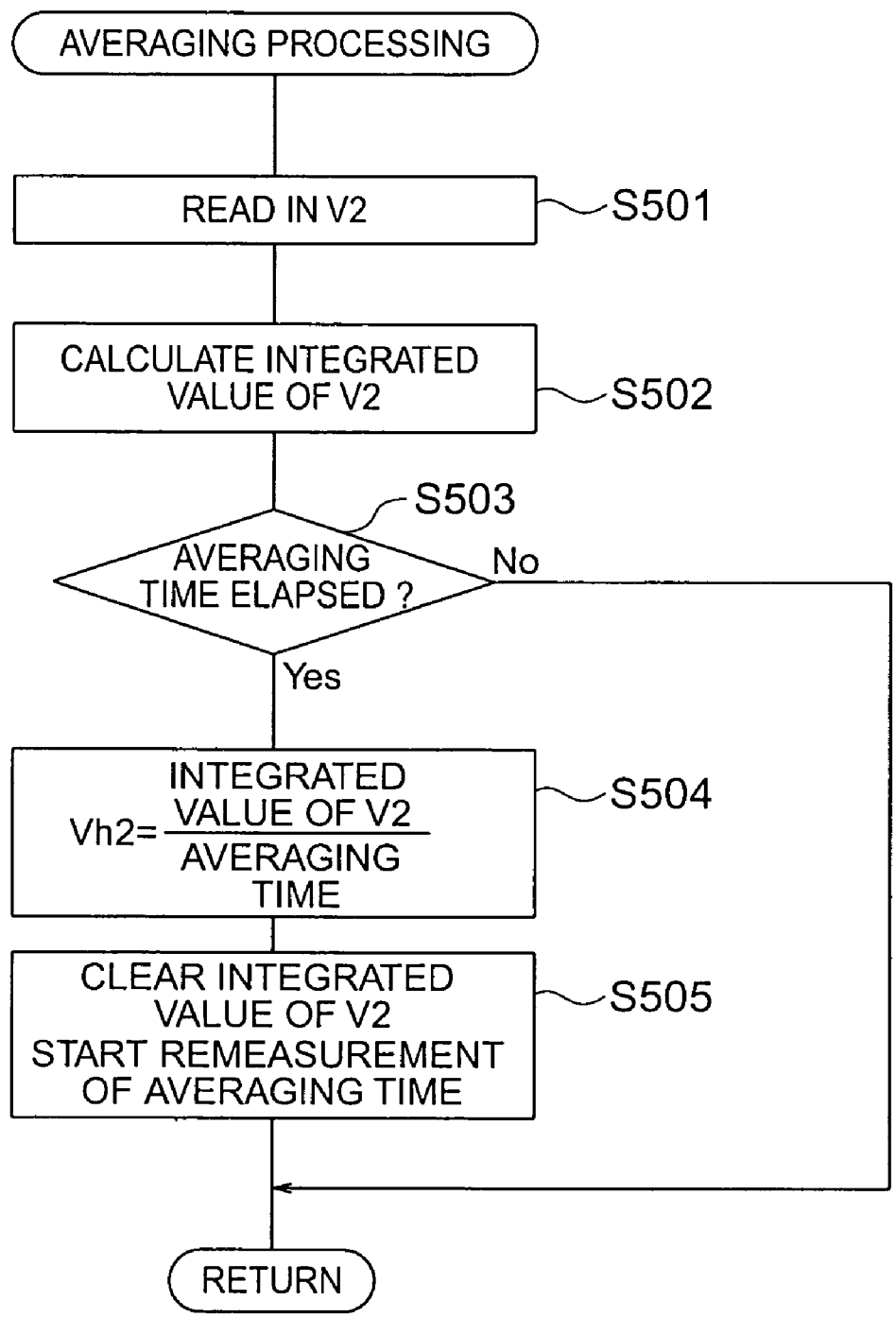
FIG. 5 is a flow chart illustrating the processing operation of an averaging section according to the first embodiment of the present invention.

FIG. 5 is a flow chart that illustrates the processing operation of the averaging section 35 according to the first embodiment of the present invention. In FIG. 5, the averaging section 35 first reads in the second air fuel ratio signal V2 (step S501), and calculates an integrated value of the second air fuel ratio signal V2 (step S502).

Subsequently, referring to the timer counter that corresponds to the elapsed time, it is determined whether a predetermined averaging time for averaging processing has elapsed (step S503), and when it is determined that the averaging time has not elapsed (that is, No), the processing routine of FIG. 5 is terminated at once, whereas when it is determined in step S503 that the averaging time has elapsed (that is, Yes), the integrated value of the second air fuel ratio signal V2 is divided by the averaging time thereby to calculate the air fuel ratio average value Vh2 thereof (step S504).

Finally, the integrated value of the second air fuel ratio signal V2 is initialized by clearing it, and the remeasurement of the elapsed time (the timer counter) until the following averaging time is reached is started (step S505), and the processing routine of FIG. 5 is terminated.

Although the averaging processing shown in FIG. 5 obtains the air fuel ratio average value Vh2 at each predetermined time (the averaging time), it is not limited to this averaging processing method, but a so-called average value of the input signal (second air fuel ratio signal V2) need only be obtained. Thus, for example, gradually changing processing of the input signal may be carried out by using a predetermined annealing factor.

Next, more specific reference will be made to the processing operation of the abnormality determination section 36 (see FIG. 2) in the ECU 30.

Figure 6:
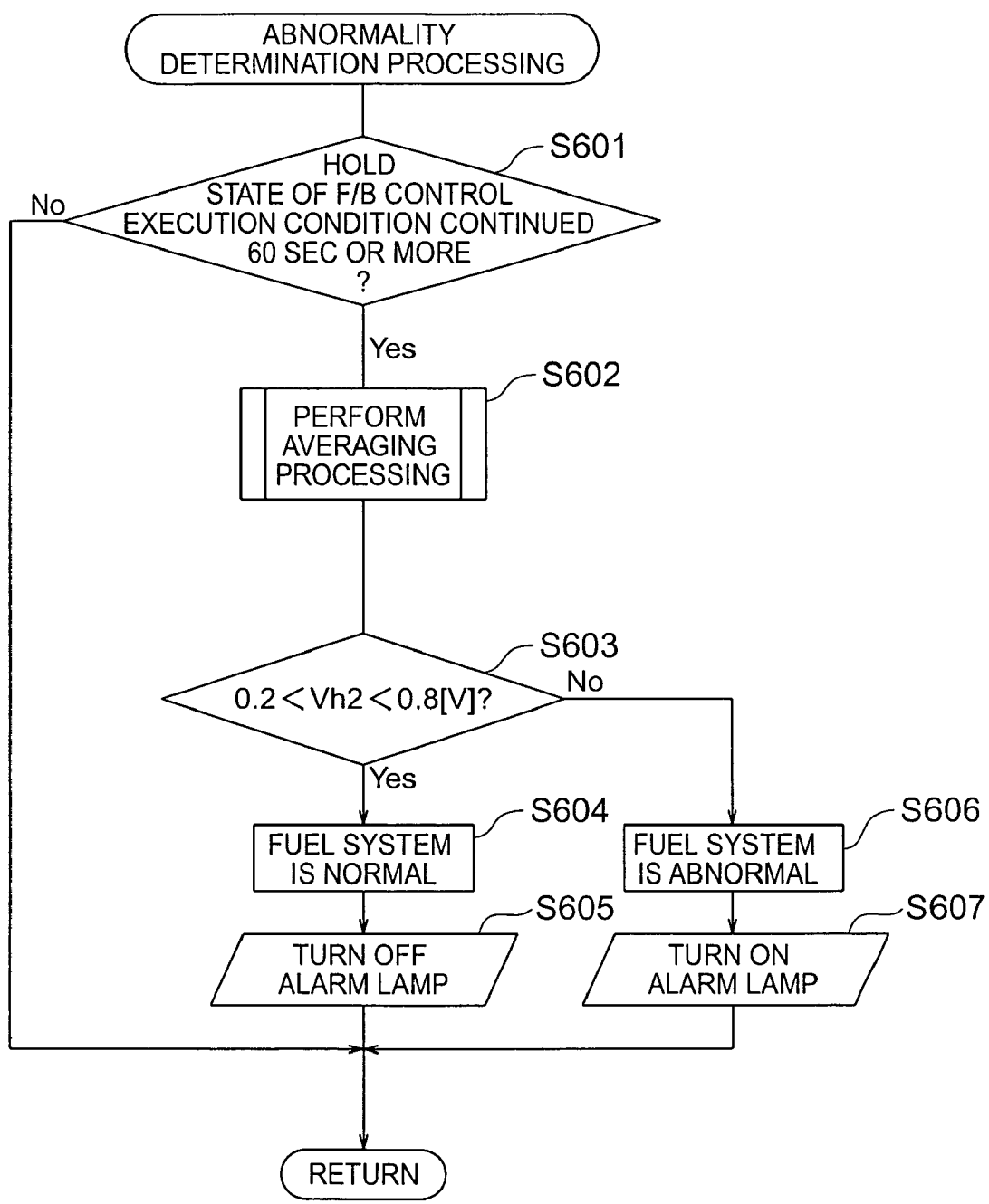
FIG. 6 is a flow chart illustrating the processing operation of an abnormality determination section according to the first embodiment of the present invention.

FIG. 6 is a flow chart that illustrates the processing operation of the abnormality determination section 36 according to the first embodiment of the present invention.

In FIG. 6, abnormality determination processing is associated with the averaging start determination section 34 and the averaging section 35, and step S601 corresponds to determination processings of the oxygen storage saturation determination section 33 and the averaging start determination section 34, and step S602 corresponds to averaging processing according to the averaging section 35. Here, note that even if the processing order of step S601 and step S602 in FIG. 6 is reversed, a result similar to the following will be obtained.

In FIG. 6, first of all, by referring to the feedback control hold flag based on the determination processing of the feedback operation state determination section 32 (see FIG. 4), the oxygen storage saturation determination section 33 and the averaging start determination section 34 determine, whether the hold state of the feedback control execution condition (flag set state) has continued for 60 [sec] or more (step S601). Here, note that duration (60 [sec]) of the hold state of the feedback control execution condition, which becomes a determination reference or criterion in step S601, is a time that is experimentally obtained, and is set to correspond to a maximum time for which the amount of oxygen storage in the catalyst 13 is saturated after the feedback control execution condition has changed from "failure" into "hold".

When it is determined in step S601 that the feedback control execution condition hold state has not continues for 60 [sec] or more (that is, No), the processing routine of FIG. 6 is terminated at once, whereas when it is determined in step S601 that the feedback control execution condition hold state has continued for 60 [sec] or more (that is, Yes), the averaging section 35 executes averaging processing (see FIG. 5) (step S602).

Subsequently, the abnormality determination section 36 determines whether the air fuel ratio average value Vh2 obtained by averaging the second air fuel ratio signal V2 is within a range of 0.2 [V] through 0.8 [V] (step S603). Here, note that the voltage values 0.2 [V] and 0.8 [V] corresponding to the abnormality determination values in step S603 are values that are experimentally obtained, and are set correspond to values at which a downstream exhaust gas component after passing through the catalyst 13 begins to increase.

When it is determined as 0.2 [V]<Vh2<0.8 [V] in step S603 (that is, Yes), it is assumed that the fuel system of the internal combustion engine 1 is in an normal state (step S604), so the alarm lamp 19 is turned off without generating an alarm drive signal E (step S605), and the processing routine of FIG. 6 is terminated.

On the other hand, when it is determined in step S603 that the air fuel ratio average value Vh2 deviates from the reference range, e.g., Vh2≦0.2 or Vh2≧0.8 (that is, No), it is assumed that the fuel system of the internal combustion engine 1 is in an abnormal state (step S606), so an alarm drive signal E is generated to turn on the alarm lamp 19 (step S607), and the processing routine of FIG. 6 is terminated.

Figure 7:
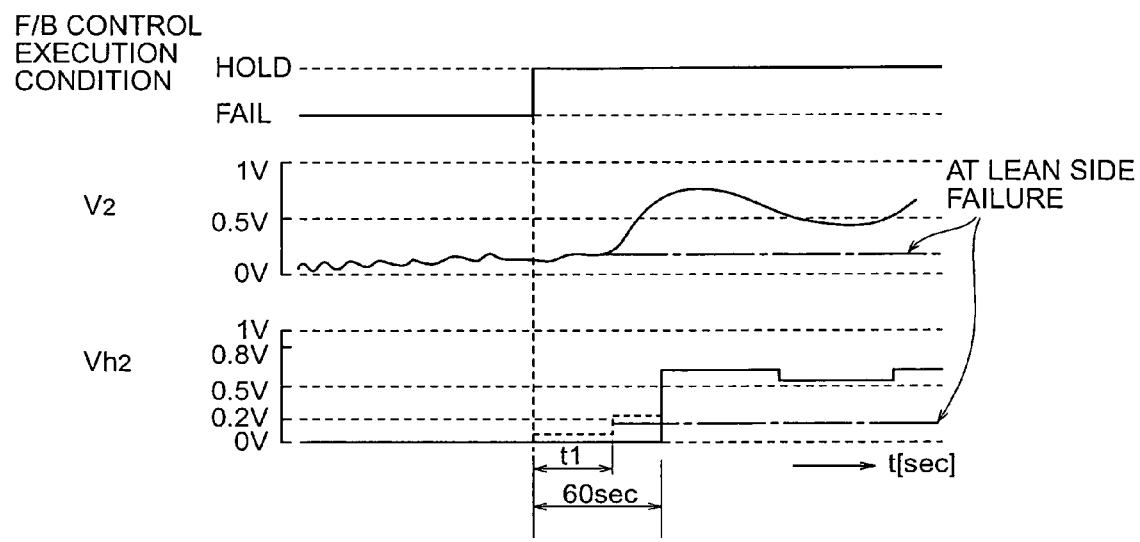
FIG. 7 is a timing chart illustrating a typical operation example in case of the determination of an abnormal state according to the first embodiment of the present invention.

FIG. 7 is a timing chart that illustrates a typical operation example in case where an abnormal state is determined, in which the abscissa represents time t.

In FIG. 7, there are shown, from top to bottom, the set state of the feedback control hold flag that indicates the hold or failure of the feedback control execution condition, and the changes over time of the second air fuel ratio signal V2 and the air fuel ratio average value Vh2, in association with one another.

In the air fuel ratio average value Vh2 in FIG. 7, the values shown by broken lines are values with the averaging processing of a conventional apparatus, in which a range t1 indicates the timing at which an abnormality determination is made by the conventional apparatus. For example, in case where feedback control is carried out based on the detection signals from the oxygen sensors upstream and downstream of a catalyst, as in the conventional apparatus, when there occurs an abnormality in the fuel system (e.g., an injector for one of a plurality of cylinders fails so that an amount of fuel larger than estimated is injected), it is impossible to control the exhaust gas downstream of the catalyst within a normal range because of the configuration of the feedback control, as indicated by alternate long and short dash lines in FIG. 7.

In contrast, according to the first embodiment of the present invention, as indicated by a solid line air fuel ratio average value Vh2 in FIG. 7, averaging processing is started at the instant when the flag set state (the hold state of the feedback control execution condition) has continued for 60 [sec] or more (i.e., after the lapse of a predetermined time is waited), so abnormality detection based on the second air fuel ratio signal V2 from the second air fuel ratio sensor (oxygen sensor) 27 downstream of the catalyst 13 can be carried out by removing the influence of the catalyst 13 in an appropriate manner without changing the construction or configuration of the conventional apparatus. Accordingly, by warning an abnormal state that a vehicle is traveling while generating a large amount of exhaust gas, by driving the alarm lamp 19, it is possible to avoid such an abnormal state. Here, note that similar results can be obtained by performing the averaging processing according to the averaging section 35 at all times while inhibiting only the abnormality determination processing.

Thus, according to the first embodiment of the present invention, in the control apparatus in which the first and second air fuel ratio sensors 26, 27 are arranged at locations upstream and downstream of the catalyst 13 so that air fuel ratio feedback control is performed based on the individual air fuel ratio signals V1, V2, the oxygen storage saturation determination section 33 is provided in the ECU 30 so that only when the amount of oxygen storage in the catalyst 13 is saturated, a determination is made, by the use of the second air fuel ratio signal V2 from the second air fuel ratio sensor 27 downstream of the catalyst 13, that the fuel system of the internal combustion engine 1 is abnormal. With such an arrangement, the abnormal state of the fuel system can be diagnosed in an appropriate or accurate manner.

In addition, by determining the saturation state of the amount of oxygen storage in the catalyst 13 based on the duration of air fuel ratio feedback control, it is possible to remove the disturbance or fluctuation of the second air fuel ratio sensor (oxygen sensor) 27 due to the fact that the amount of oxygen storage is not saturated, thereby making it possible to achieve an accurate abnormality determination of the fuel system.

Embodiment 2

Although in the above-mentioned first embodiment, the oxygen storage saturation determination section 33 determines whether the hold state of the feedback control execution condition has continued for the predetermined time, a restored state from a fuel-cut operation or a restored state from a fuel enrichment operation may be added as a determination condition.

Hereinafter, reference will be made to a second embodiment of the present invention in which a restored state from a fuel-cut operation or a restored state from a fuel enrichment operation is added as a determination condition, while referring to the FIG. 8 through FIG. 10.

Figure 8:
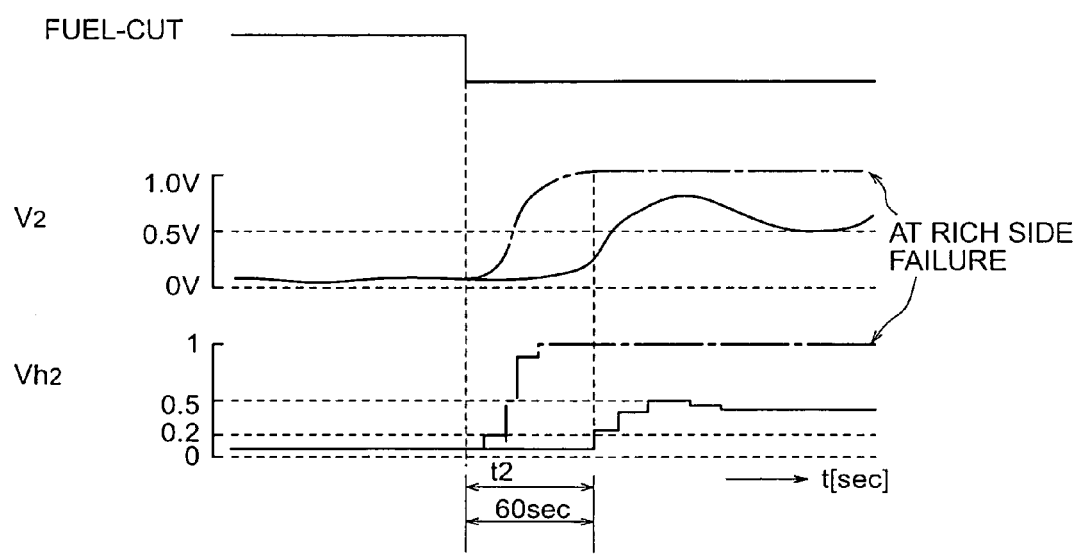
FIG. 8 is a timing chart showing a processing operation according to a second embodiment of the present invention in case where a fuel-cut state is added to an averaging execution condition.
Figure 9:
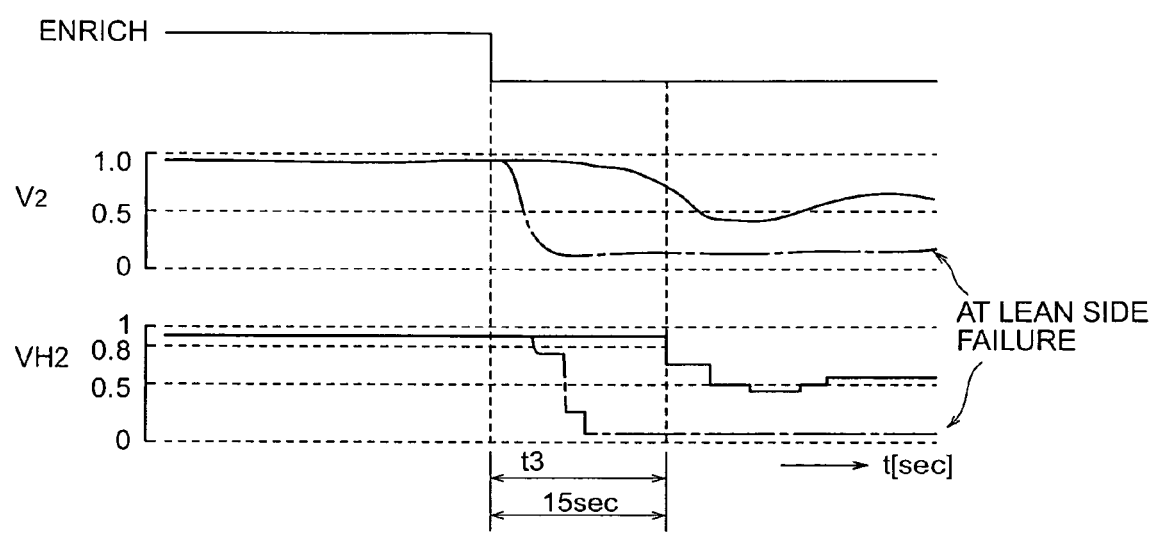
FIG. 9 is a timing chart showing a processing operation according to the second embodiment of the present invention in case where an enrichment state is added to the averaging execution condition.

FIGS. 8 and 9 are timing charts that illustrate processing operations of an abnormality diagnosis apparatus for an internal combustion engine according to the second embodiment of the present invention, wherein there are shown typical operational examples, respectively, similar to the above-mentioned one (see FIG. 7). FIG. 8 shows an operational example when restoration from a fuel-cut state is added to the determination condition in the oxygen storage saturation determination section 33, and FIG. 9 shows an operational example when restoration from a fuel enrichment state is added to the determination condition in the oxygen storage saturation determination section 33. Also, FIG. 10 is a flow chart that shows the essential portions of the processing operations of the oxygen storage saturation determination section 33 and the averaging start determination section 34 in the ECU 30 (see FIG. 2) according to the second embodiment of the present invention.

Figure 10:
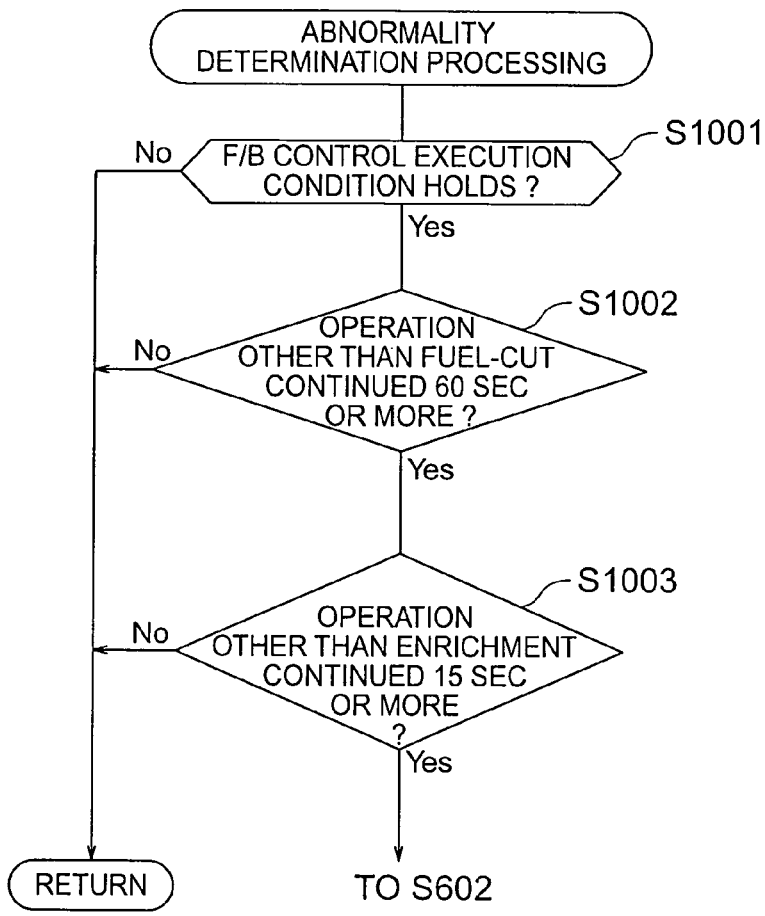
FIG. 10 is a flow chart showing the essential portions of the processing operations of an oxygen storage saturation determination section and an averaging start determination section according to the second embodiment of the present invention.

In FIG. 10, the oxygen storage saturation determination section 33 and the averaging start determination section 34 in association with the abnormality determination section 36 executes three determination steps S1001 through S1003 in place of the above-mentioned step S601 (see FIG. 6) and then advances to averaging processing (step S602) in FIG. 6 when the result of each determination is "Yes". In this case, in the ECU 30, the oxygen storage saturation determination section 33 in association with the abnormality determination section 36 includes a fuel-cut determination section (step S1002) that determines, as a fuel-cut state, an engine operating state that does not need the supply of fuel to the internal combustion engine 1, and calculates a "first elapsed time" after the engine operating state has changed from the fuel-cut state to another operating state other than that.

In addition, the fuel-cut determination section includes a first predetermined time calculation section that calculates a first predetermined time or elapsed time (e.g., 60 [sec]) for which the amount of oxygen storage in the catalyst 13 reaches a first predetermined value.

The oxygen storage saturation determination section 33 in the ECU 30 includes an enrichment determination section (step S1003) that sets the amount of fuel supplied to the internal combustion engine 1 to a value richer than an air fuel ratio at which the catalyst 13 operates efficiently, determines, as an enrichment state, an operating state of the internal combustion engine 1 in which the air fuel ratio is controlled to a power air fuel ratio for power augmentation, and calculates a "second elapsed time" after the engine operating state has changed from the enrichment state into another operating state other than that.

In addition, the enrichment determination section includes a second predetermined time calculation section that calculates a second predetermined time or elapsed time (e.g., 15 [sec]) for which the amount of oxygen storage in the catalyst 13 reaches a second predetermined value. As a result, the oxygen storage saturation determination section 33 determines that the amount of oxygen storage in the catalyst 13 is saturated when the first elapsed time becomes equal to or more than the first predetermined time or the second elapsed time becomes equal to or more than the second predetermined time.

Hereinafter, reference will be made to an abnormality determination processing operation according to the second embodiment of the present invention while referring to FIG. 10 together with FIG. 8 and FIG. 9.

Here, note that the overall construction of the apparatus and the general averaging processing according to the second embodiment of the present invention are substantially similar to those in the above-mentioned first embodiment (see FIG. 1 through FIG. 5), but are only different in part therefrom in the functions of the oxygen storage saturation determination section 33 and the averaging start determination section 34 in the ECU 30.

In the air fuel ratio average value Vh2 in FIG. 8, according to the averaging value of the conventional apparatus, there is no waiting time, similar to the above (see FIG. 7), so an abnormality determination is performed in an early period or range t2 immediately after the fuel-cut state has changed into a non-execution state.

In contrast, according to the second embodiment of the present invention, the calculation processing of the air fuel ratio average value Vh2 (see a solid line) is executed after the lapse of the first predetermined time (60 [sec]) after the engine operating state has changed from the fuel-cut execution state into the fuel-cut non-execution state.

Similarly, according to the averaging value of the conventional apparatus, in the air fuel ratio average value Vh2 in FIG. 9, an abnormality determination is performed in an early range t3 immediately after the enrichment state has changed into a non-execution state.

In contrast, according to the second embodiment of the present invention, the calculation processing of the air fuel ratio average value Vh2 (see a solid line) is executed after the lapse of the second predetermined time (15 [sec]) after the engine operating state has changed from the enrichment execution state into the enrichment non-execution state.

In FIG. 10, the oxygen storage saturation determination section 33 and the averaging start determination section 34 in association with the abnormality determination section 36 first determine whether the feedback control execution condition holds (step S1001), and when it is determined in step S1001 that the feedback control execution condition holds (that is, Yes), it is subsequently determined whether a period of time of 60 [sec] or more has elapsed after the operating condition of the internal combustion engine 1 has changed from the fuel-cut execution state into the fuel-cut non-execution state (a state other than the fuel-cut state) (step S1002).

When it is determined in step S1002 that the fuel-cut non-execution state has continued for 60 [sec] or more (that is, Yes) after the engine operating state has changed into the fuel-cut non-execution state, it is subsequently determined whether a period of time of 15 [sec] or more has elapsed after the operating condition of the internal combustion engine 1 has changed from the enrichment execution state into the enrichment non-execution state (a state other than the enrichment state) (step S1002), whereas when it is determined in step S1002 that the enrichment non-execution state has continued for 15 [sec] or more (that is, Yes) after the engine operating state has changed into the enrichment non-execution state, the control flow advances to averaging processing (step S602) in FIG. 6 where the processing of FIG. 5 according to the averaging section 35 is executed.

On the other hand, when it is determined in any of steps S1001 through S1003 that the condition fails (that is, No), the processing routine of FIG. 10 is terminated at once.

Here, note that the effectiveness of the addition of the restoration from the fuel-cut state and the restoration from the enrichment state as conditions for the determination processing of the saturation of the amount of oxygen storage in the catalyst 13 in addition to the feedback control execution condition is experimentally known.

In addition, in the second embodiment of the present invention, the determination time (15 [sec]) upon restoration from the enrichment state in which the time for which the amount of oxygen storage is saturated shortens is set shorter than the determination time (60 [sec]) upon restoration from the fuel-cut state, and is set to correspond to a maximum time for which the amount of oxygen storage in the catalyst 13 is saturated.

As described above, according to the second embodiment of the present invention, in order to determine the saturation of the amount of oxygen storage in the catalyst 13 in a more accurate manner than in the above-mentioned first embodiment, the averaging start time can be set separately with respect to the individual conditions for restoration from the fuel-cut state and restoration from the enrichment state, so it is possible to start the averaging processing in a duration of air fuel ratio feedback control which is shorter than that in the above-mentioned first embodiment, whereby the frequency of executions of the fuel system abnormality determination processing can be increased, thus making it possible to improve the reliability of the abnormality determination.

Embodiment 3

Although not particularly referred to in the above-mentioned first and second embodiments, an exhaust gas flow rate estimation section that estimates the flow rate of exhaust gas passing through the catalyst 13 may be provided in the oxygen storage saturation determination section 33, so that the predetermined time or the first and second predetermined time in the form of a determination condition for averaging processing can be set to a time corresponding to the flow rate of exhaust gas obtained by the exhaust gas flow rate estimation section.

Hereinafter, reference will be made to an abnormality diagnosis apparatus for an internal combustion engine with such an exhaust gas flow rate estimation section according to a third embodiment of the present invention while referring to FIGS. 11 through 16. Here, note that the overall construction of the apparatus and the general averaging processing according to the third embodiment of the present invention are substantially similar to those in the above-mentioned first embodiment (see FIG. 1 through FIG. 5), but are only different in part therefrom in the functions of the oxygen storage saturation determination section 33 and the averaging start determination section 34 in the ECU 30.

Figure 11:
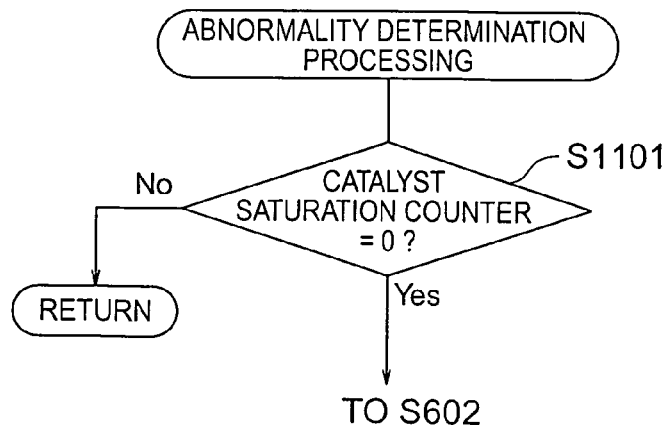
FIG. 11 is a flow chart illustrating the essential portions of the abnormality determination processing of an abnormality diagnosis apparatus for an internal combustion engine according to a third embodiment of the present invention.

FIG. 11 is a flow chart that illustrates the essential portions of the abnormality determination processing of the abnormality diagnosis apparatus for an internal combustion engine according to the third embodiment of the present invention.

In FIG. 11, the oxygen storage saturation determination section 33 and the averaging start determination section 34 in association with the abnormality determination section 36 executes a determination step S1101 in place of the above-mentioned step S601 (see FIG. 6) and then advances to averaging processing (step S602) in FIG. 6 when the result of the determination is "Yes".

Figure 12:
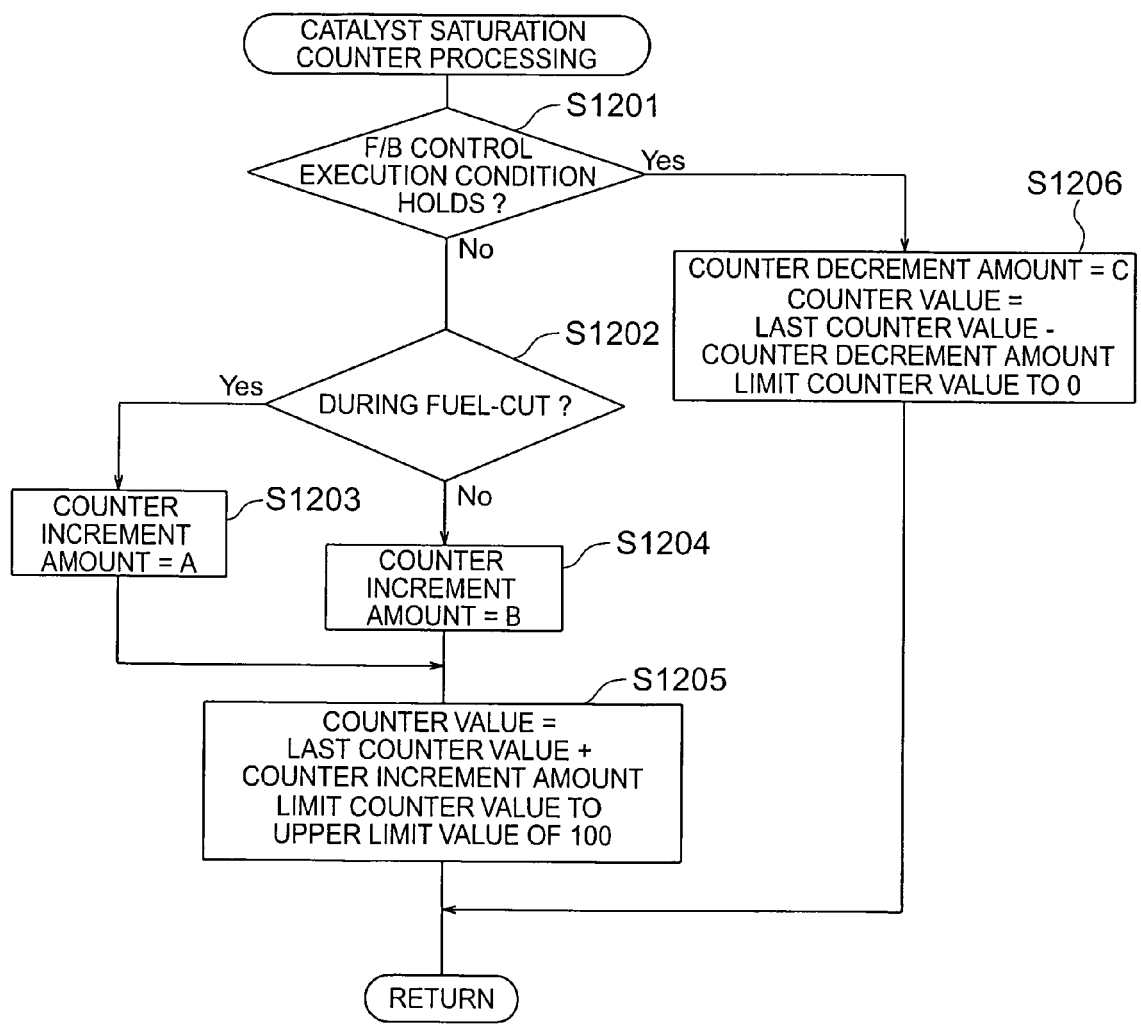
FIG. 12 is a flow chart showing the processing operation of a catalyst saturation counter used in an oxygen storage saturation determination section and an averaging start determination section according to the third embodiment of the present invention.
Figure 13:
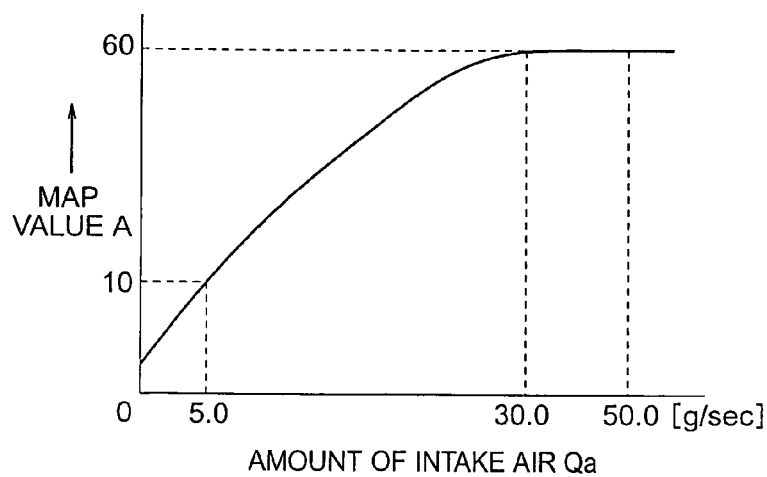
FIG. 13 is an explanatory view showing a specific setting example of a counter increment value that is set when a fuel-cut operation is executed according to a third embodiment of the present invention.
Figure 14:
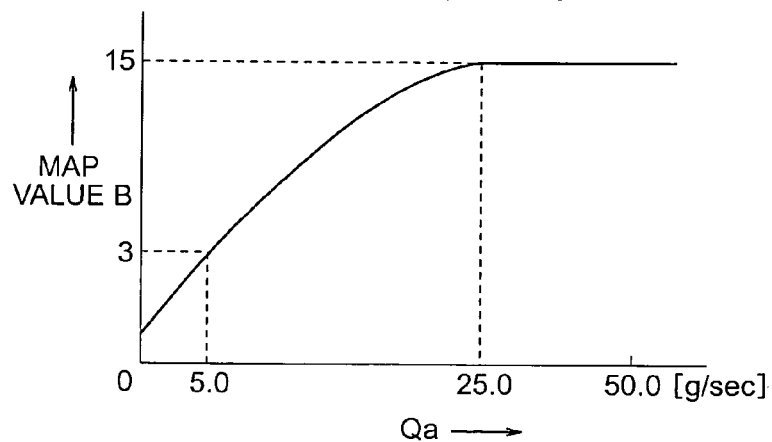
FIG. 14 is an explanatory view showing a specific setting example of a counter increment value that is set when a fuel-cut operation is not executed according to the third embodiment of the present invention.
Figure 15:
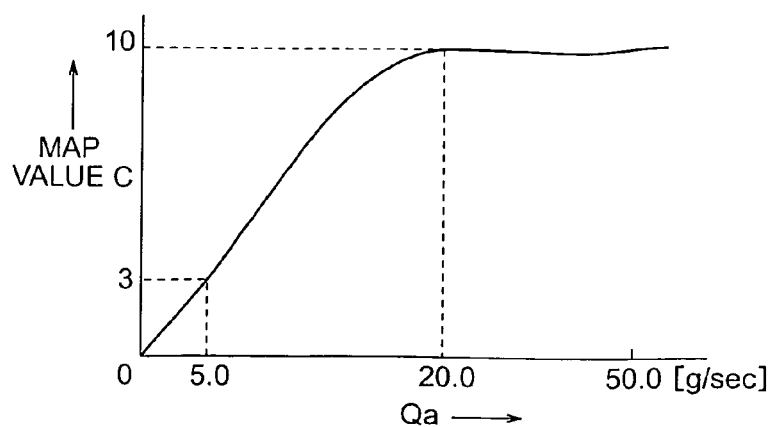
FIG. 15 is an explanatory view showing a specific setting example of a counter decrement value that is set when a feedback control execution condition holds according to the third embodiment of the present invention.
Figure 16:
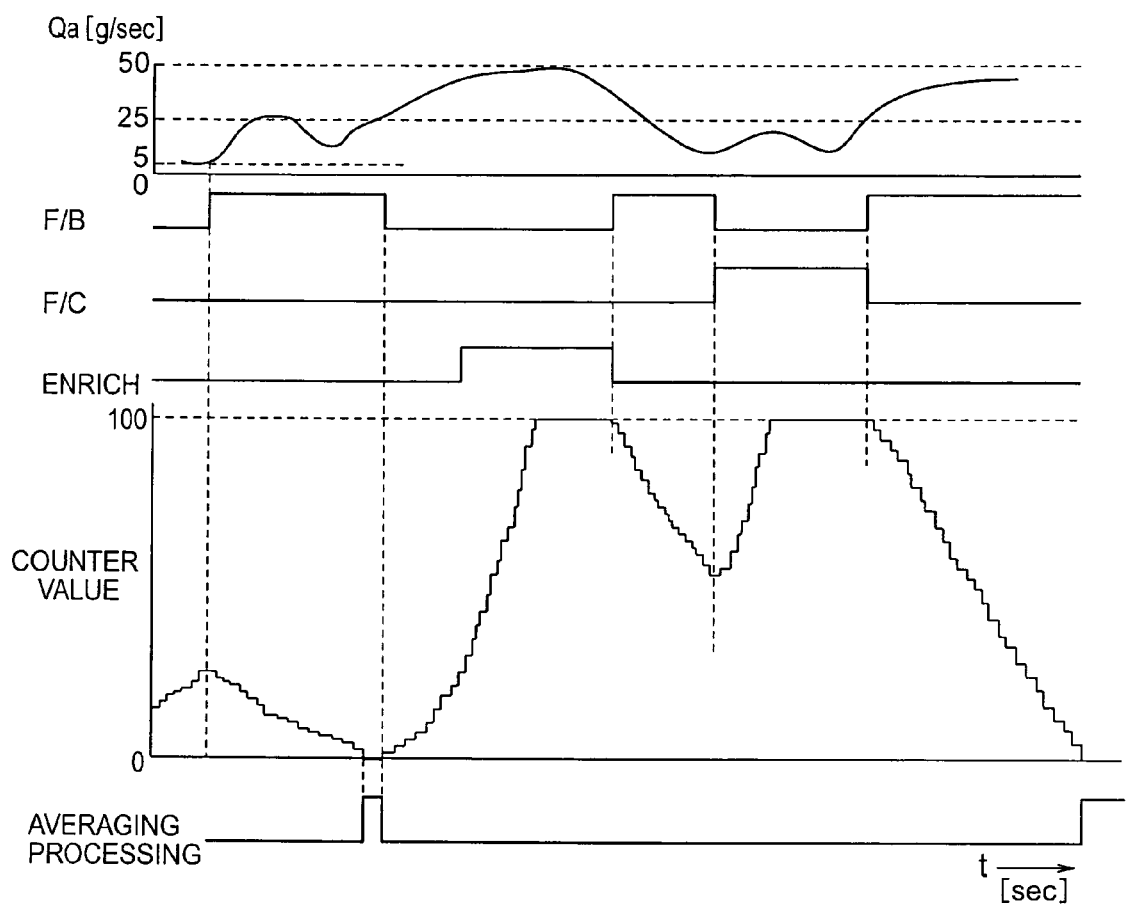
FIG. 16 is a timing chart illustrating a typical operation example according to the third embodiment of the present invention.

FIG. 12 is a flow chart that shows the processing operation of a catalyst saturation counter used in the oxygen storage saturation determination section 33 according to the third embodiment of the present invention. FIG. 13 through FIG. 15 are explanatory views that show specific setting examples (map values A through C) of the counter change (increment or decrement) value set in steps S1203 through S1206 in FIG. 12. In FIG. 13 through FIG. 15, the individual map values A through C represent the estimated values of the flow rate of exhaust gas passing through the catalyst 13 (the axis of ordinate) corresponding to the amount of intake air Qa (the axis of abscissa) in the internal combustion engine 1. FIG. 16 is a timing chart that illustrates a typical operation example according to the third embodiment of the present invention.

In FIG. 16, there are shown in mutual association with one another, from top to bottom, the change over time of the amount of intake air Qa [g/sec], the state of feedback control (an "ON" represents an F/B (feedback) execution state and an "OFF" represents an F/B non-execution state), the fuel cut-off state (an "ON" represents a fuel-cut execution state and an "OFF" represents a fuel-cut non-execution state), the state of fuel enrichment (an "ON" represents an enrichment execution state and an "OFF" represents an enrichment non-execution state), the change over time of the catalyst saturation counter value, and the state of averaging processing according to the averaging section 35 (an "ON" represents an averaging processing execution state and an "OFF" represents an averaging processing non-execution state).

In FIG. 16, averaging processing for the air fuel ratio signal V2 is executed when the catalyst saturation counter value is counted down to "0". In this case, the oxygen storage saturation determination section 33 includes the exhaust gas flow rate estimation section for estimating the flow rate of exhaust gas passing through the catalyst 13 (correlating to the amount of intake air Qa), and determines that the amount of oxygen storage in the catalyst 13 is saturated, by setting the predetermined time or the first or second predetermined time, which becomes a determination reference or criterion for starting the above-mentioned averaging processing, to a time corresponding to the flow rate of exhaust gas obtained by the exhaust gas flow rate estimation section.

Although the exhaust gas flow rate estimation section using the amount of intake air Qa is exemplified herein as a general method applying the construction or configuration of the conventional apparatus, the exhaust gas flow rate estimation section according to the third embodiment of the present invention is not limited to the one shown in FIG. 11 through FIG. 16. For example, a sensor element which contributes to the estimation of an exhaust gas flow rate may be added to the exhaust system if an increase in costs is ignored.

In addition, the estimation processing of the flow rate of exhaust gas is carried out so as to set the change (increment or decrement) value (to be described later) of the catalyst saturation counter, so if the magnitude of the flow rate of exhaust gas (the amount of intake air Qa) is detected, the change value of the catalyst saturation counter need only be set to a value obtained through experiments.

Specifically, in FIG. 11, the oxygen storage saturation determination section 33 determines whether the value of the catalyst saturation counter is equal to "0" (step S1101), and when it is determined as the catalyst saturation counter=0 (that is, Yes), the control flow advances to averaging processing (step S602) in FIG. 6, whereas when it is determined as the catalyst saturation counter>0 in step S1101 (that is, No), the processing routine of FIG. 11 is terminated at once.

Also, in the processing of the catalyst saturation counter in FIG. 12, it is first determined whether the feedback control execution condition holds (step S1201), and when it is determined that the feedback control execution condition fails (that is, No), it is subsequently determined whether the engine operating state is in a fuel-cut operation (step S1202), and when it is determined in step S1202 that the engine operating state is under fuel-cut operation (that is, Yes), the counter increment value is set to a relatively large map value A (see FIG. 13) (step S1203), and the control flow advances to the addition processing of the counter value (step S1205). Here, note that the map value A for setting the increment value during the fuel-cut operation is incrementally set up to a maximum value of "60" in accordance with the increasing amount of intake air Qa [g/sec], as shown in FIG. 13.

On the other hand, when it is determined in step S1202 that the engine operating state is not in a fuel-cut operation (that is, No), the counter increment value is set to a relatively small map value B (see FIG. 14) (step S1204), and the control flow advances to the addition processing of the counter value (step S1205). The map value B for setting the increment value during non-execution of a fuel-cut operation is incrementally set up to a maximum value of "15" in accordance with the increasing amount of intake air Qa [g/sec], as shown in FIG. 14.

In step S1205, the value of the catalyst saturation counter is set by update to a value which is obtained by adding the counter increment value to the last counter value. The counter value thus added is limited to an upper limit value of "100", and the processing routine of FIG. 12 is terminated.

On the other hand, when it is determined in step S1201 that the feedback control execution condition holds (that is, Yes), the subtraction processing of the counter value (step S1206) is executed, and the processing routine of FIG. 12 is terminated.

In step S1206, the counter decrement value is set to a map value C (see FIG. 15)(step S1206), and the value of the catalyst saturation counter is set by update to a value which is obtained by subtracting the counter decrement value from the last counter value. The counter value thus subtracted is limited to a lower limit value of "0". The map value C for setting the decrement value when the feedback control execution condition holds is incrementally set up to a maximum value of "10" in accordance with the increasing amount of intake air Qa [g/sec], as shown in FIG. 15.

As described above, according to the third embodiment of the present invention, in order to determine the saturation of the amount of oxygen storage in the catalyst 13 more accurately than in the above-mentioned first and second embodiments, the start timing of averaging processing can be set by estimating the flow rate of exhaust gas passing through the catalyst 13, so it is possible to start the averaging processing with a duration of air fuel ratio feedback control shorter than that in the above-mentioned first and second embodiments, thereby making it possible to achieve a further accurate abnormality determination of the fuel system.

Embodiment 4

Although not particularly referred to in the above-mentioned first through third embodiments, a catalyst activation estimation section or a catalyst degradation determination section may be provided so that only when it is estimated that the catalyst is activated or only when it is determined that the catalyst has not been deteriorated, various kinds of processing operations or the result of diagnosis can be made effective.

Hereinafter, reference will be made to an abnormality diagnosis apparatus for an internal combustion engine with such a catalyst activation estimation section or a catalyst degradation determination section according to a fourth embodiment of the present invention while referring to FIG. 17.

Figure 17:
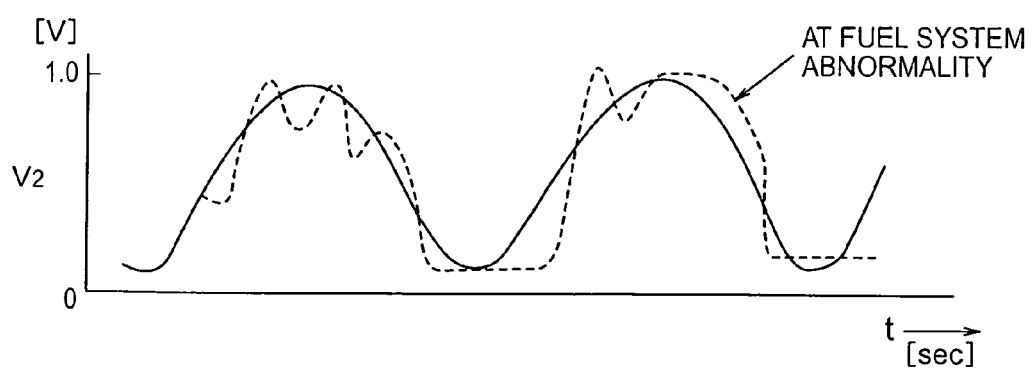
FIG. 17 is a timing chart explaining a processing inhibition operation of an abnormality diagnosis apparatus for an internal combustion engine according to a fourth embodiment of the present invention.

FIG. 17 is a timing chart that explains a processing inhibition operation of the abnormality diagnosis apparatus for an internal combustion engine according to the fourth embodiment of the present invention, wherein there is shown the voltage change of an air fuel ratio signal V2 from the second air fuel ratio sensor (oxygen sensor) 27 downstream of the catalyst 13 when the catalyst 13 is deactivated or degraded to decrease the amount of oxygen storage therein.

In this case, the ECU 30 is provided with the catalyst activation estimation section that estimates the activated state of the catalyst 13 by integrating an operation state signal D, so that the various kinds of processing operations can be made effective only when the catalyst activation estimation section estimates that the catalyst 13 is activated.

Alternatively, the ECU 30 is provided with the catalyst degradation determination section that detects the degradation of the catalyst 13 based on the first and second air fuel ratio signals V1, V2 (output signal values) from the individual air fuel ratio sensors 26, 27, respectively, so that the various kinds of processing operations or the result of analysis can be made effective only when the catalyst degradation determination section determines that the catalyst is not degraded.

As clear from FIG. 17, when the state of the catalyst 13 is deactivated or degraded, the voltage value of the second air fuel ratio signal V2 (see a solid line) varies, and hence can not be distinguished from a voltage value (see a broken line) at the time of abnormality in the fuel system, so the above-mentioned abnormality determination processing for the fuel system and the like of the internal combustion engine 1 can not be executed. Accordingly, when the deactivated or inactive state or the degraded state of the catalyst 13 is determined, the abnormality determination processing is not executed.

Specifically, activation determination processing (catalyst activation estimation section), which determines whether the catalyst 13 is in an activated or active state or degradation determination processing (catalyst degradation determination section), which determines whether the catalyst 13 is in a normal state, is inserted at an upstream side of step S601 in the abnormality determination processing (see FIG. 6) for example, and when the result of determination in this determination processing (the catalytic activation estimation section or the catalyst degradation determination section) indicates "the active state or the normal state of the catalyst 13 (that is, Yes)", processings in step S601 and onward are executed, whereas when the result of determination indicates "the inactive state or the degraded state of the catalyst 13 (that is, No)", the control flow may be made to go to the result of determination of "No" side in step S601 without executing steps S601 and onward.

As described above, according to this fourth embodiment of the present invention, in order to prevent an incorrect determination of abnormality in the fuel system resulting from the catalyst 13, averaging processing is started only after the catalyst 13 is activated or only when it is not determined that the catalyst 13 is in a degraded state, so incorrect determination due to the disturbance or fluctuation of the second air fuel ratio sensor (oxygen sensor) 27 resulting from the state of the catalyst 13 can be removed, thereby making it possible to achieve an accurate abnormality determination of the fuel system.

Although reference has been made herein to the case where only one of the catalytic activation estimation section and the catalyst degradation determination section is provided, both the catalytic activation estimation section and the catalyst degradation determination section may instead be provided, so that averaging processing is started after the catalyst 13 is activated and only when it is not determined that the catalyst 13 is in a degraded state.

While the invention has been described in terms of preferred embodiments, those skilled in the art will recognize that the invention can be practiced with modifications within the spirit and scope of the appended claims.

What is claimed is:

1. An abnormality diagnosis apparatus for an internal combustion engine comprising:
   a variety of kinds of sensors that detect an operating condition of said internal combustion engine having an exhaust system;
   a first air fuel ratio sensor and a second air fuel ratio sensor that are arranged at locations upstream and downstream of a catalyst arranged in said exhaust system for detecting the concentration of a specific component in an exhaust gas;
   a first comparison section that compares a first output signal value of said first air fuel ratio sensor with a first comparison value;
   a second comparison section that compares a second output signal value of said second air fuel ratio sensor with a second comparison value;
   a comparison value calculation section that calculates said first comparison value in accordance with a comparison result of said second comparison section;
   an air fuel ratio correction amount calculation section that calculates an air fuel ratio correction amount corresponding to a comparison result of said first comparison section;
   a feedback control section that controls an amount of fuel supplied to said internal combustion engine in accordance with said air fuel ratio correction amount in a feedback manner;
   a feedback operation state determination section that determines whether said engine operating state is a feedback operation state in which said feedback control section is operated;
   an averaging section that averages said second output signal value during operation of said comparison value calculation section;
   an oxygen storage saturation determination section that determines whether an amount of oxygen storage in said catalyst is in a saturated state;
   an averaging start determination section that activates said averaging section only when said oxygen storage saturation determination section determines that the amount of oxygen storage in said catalyst is saturated; and
   a fuel control system abnormality determination section that determines the presence of abnormality in said fuel control system of said internal combustion engine when the air fuel ratio average value calculated by said averaging section becomes out of a predetermined range;
   wherein said oxygen storage saturation determination section calculates a time of execution of feedback control elapsed after a determination result of said feedback operation state determination section has changed from a non-feedback operation state into a feedback operation state, and determines that the amount of oxygen storage in said catalyst is saturated when said elapsed time reaches a predetermined time or more at which the amount of oxygen storage in said catalyst becomes a predetermined value.

2. The abnormality diagnosis apparatus for an internal combustion engine as set forth in claim 1, wherein said oxygen storage saturation determination section includes:
   a fuel-cut determination section that determines, as a fuel-cut state, an engine operating state that does not need the supply of fuel to said internal combustion engine, and calculates a first elapsed time after said engine operating state has changed from said fuel-cut state to another operating state other than said fuel-cut state;
   a first predetermined time calculation section that calculates a first predetermined time by which the amount of oxygen storage in said catalyst reaches a first predetermined value;
   an enrichment determination section that sets the amount of fuel supplied to said internal combustion engine to a value richer than an air fuel ratio at which said catalyst operates efficiently, determines, as an enrichment state, an operating state of said internal combustion engine in which the air fuel ratio of a mixture supplied thereto is controlled to a power air fuel ratio for power augmentation, and calculates a second elapsed time after the engine operating state has changed from said enrichment state into another operating state other than said enrichment state; and
   a second predetermined time calculation section that calculates a second predetermined time by which the amount of oxygen storage in said catalyst reaches a second predetermined value;
   wherein when said first elapsed time becomes equal to or more than said first predetermined time, or when said second elapsed time becomes equal to or more than said second predetermined time, it is determined that the amount of oxygen storage of said catalyst is saturated.

3. The abnormality diagnosis apparatus for an internal combustion engine as set forth in claim 1, wherein
   said oxygen storage saturation determination section includes an exhaust gas flow rate estimation section that estimates the flow rate of exhaust gas passing through said catalyst; and
   said oxygen storage saturation determination section determines that the amount of oxygen storage in said catalyst is saturated, by setting said predetermined time or said first or second predetermined time to a time corresponding to the flow rate of exhaust gas obtained by said exhaust gas flow rate estimation section.

4. The abnormality diagnosis apparatus for an internal combustion engine as set forth in claim 1, further comprising:
   a catalyst activation estimation section that estimates an activated state of said catalyst by integrating said engine operating state;
   wherein various kinds of processing operations can be made effective only when said catalyst activation estimation section estimates that said catalyst is activated.

5. The abnormality diagnosis apparatus for an internal combustion engine as set forth in claim 1, further comprising:
   a catalyst degradation determination section that detects the degradation of said catalyst based on said first and second output signal values;
   wherein various kinds of processing operations or a result of analysis can be made effective only when said catalyst degradation determination section determines that said catalyst is not degraded.

* * * * *